(12) United States Patent
Yan

(10) Patent No.: US 10,109,006 B2
(45) Date of Patent: Oct. 23, 2018

(54) VEHICLE-MOUNTED TERMINAL, CHARGING PILE, ELECTRIC BICYCLE, AND RENTAL SYSTEM AND METHOD THEREOF

(71) Applicant: ZHEJIANG RIGHT DIGITAL TECHNOLOGY CO., LTD., Zhejiang (CN)

(72) Inventor: Ming Yan, Zhejiang (CN)

(73) Assignee: ZHEJIANG RIGHT DIGITAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 15/391,329

(22) Filed: Dec. 27, 2016

(65) Prior Publication Data
US 2017/0364995 A1    Dec. 21, 2017

(30) Foreign Application Priority Data

Jun. 17, 2016  (CN) .......................... 2016 1 0445359

(51) Int. Cl.
| | | |
|---|---|---|
| *G06Q 30/06* | (2012.01) | |
| *B62H 3/00* | (2006.01) | |
| *B62J 99/00* | (2009.01) | |
| *B60L 11/18* | (2006.01) | |
| *H02J 7/00* | (2006.01) | |

(52) U.S. Cl.
CPC ...... *G06Q 30/0645* (2013.01); *B60L 11/1825* (2013.01); *B60L 11/1848* (2013.01); *B62H 3/00* (2013.01); *B62J 99/00* (2013.01); *H02J 7/007* (2013.01); *H02J 7/0042* (2013.01); *B60L 2200/12* (2013.01); *B62H 2003/005* (2013.01); *B62J 2099/0013* (2013.01)

(58) Field of Classification Search
None
See application file for complete search history.

(56) References Cited

U.S. PATENT DOCUMENTS

| | | | | |
|---|---|---|---|---|
| 3,800,898 A | * | 4/1974 | Griffin ..................... | B60K 1/00 180/206.5 |
| 4,516,647 A | * | 5/1985 | Novak ...................... | B60L 8/00 136/291 |
| 5,812,070 A | * | 9/1998 | Tagami ............... | G07F 17/0042 340/457.4 |

(Continued)

*Primary Examiner* — Patrick McAtee
(74) *Attorney, Agent, or Firm* — Volpe and Koenig, P.C.

(57) ABSTRACT

The disclosure relates to an intelligent transportation field. A vehicle-mounted terminal, a charging pile, an electric bicycle, and a rental system and a rental method of the electric bicycle are described. The vehicle-mounted terminal for the electric bicycle comprises: a receiver configured to receive a rental request; and a controller configured to: acquire the performance state of an electric bicycle targeted by the rental request, in response to the rental request; communicate with a server to authenticate the validity of the renter, if the acquired performance state meets preset rental criteria; and issue an unlocking instruction signal to a charging pile to unlock the electric bicycle, if a successful authentication message is received from the server. The vehicle-mounted terminal communicates with the server, so that the back-end server can obtain the service condition of the rented bicycle in real time, and can monitor and manage the bicycle.

16 Claims, 11 Drawing Sheets

(56) References Cited

U.S. PATENT DOCUMENTS

| | | | | |
|---|---|---|---|---|
| 5,878,831 A * | 3/1999 | Saito | B60L 11/1801 | 180/206.2 |
| 5,917,407 A * | 6/1999 | Squire | B62H 3/00 | 194/205 |
| 5,963,140 A * | 10/1999 | Kawaguchi | B60L 11/1801 | 320/127 |
| 6,154,006 A * | 11/2000 | Hatanaka | B60L 11/1801 | 320/107 |
| 6,157,315 A * | 12/2000 | Kokubo | G07B 15/00 | 211/5 |
| 6,850,898 B1 * | 2/2005 | Murakami | B60L 11/1816 | 340/932.2 |
| 7,342,321 B2 * | 3/2008 | Kitamura | B62M 25/08 | 290/1 R |
| 2002/0174077 A1 * | 11/2002 | Yui | G06Q 20/127 | 705/400 |
| 2005/0246152 A1 * | 11/2005 | Kokatsu | B62M 6/45 | 703/22 |
| 2006/0226879 A1 * | 10/2006 | Kitamura | B62J 6/003 | 327/94 |
| 2007/0220933 A1 * | 9/2007 | Gagosz | B62H 3/00 | 70/233 |
| 2009/0295329 A1 * | 12/2009 | Yugou | B60L 3/0046 | 320/116 |
| 2010/0228405 A1 * | 9/2010 | Morgal | B62H 3/02 | 701/2 |
| 2010/0245128 A1 * | 9/2010 | Kanof | B62H 3/00 | 340/932.2 |
| 2010/0280700 A1 * | 11/2010 | Morgal | G06Q 10/02 | 701/31.4 |
| 2010/0313614 A1 * | 12/2010 | Rzepecki | B62H 5/145 | 70/233 |
| 2011/0025267 A1 * | 2/2011 | Kamen | B60L 8/003 | 320/109 |
| 2011/0079453 A1 * | 4/2011 | Wanger | B62K 27/003 | 180/11 |
| 2012/0161677 A1 * | 6/2012 | Kunimitsu | H01M 2/1077 | 318/139 |
| 2012/0191511 A1 * | 7/2012 | Li | H04W 4/046 | 705/13 |
| 2013/0020970 A1 * | 1/2013 | Zhang | B62M 6/45 | 318/139 |
| 2013/0173097 A1 * | 7/2013 | Jotanovic | G01C 21/3469 | 701/22 |
| 2013/0211885 A1 * | 8/2013 | Carpinteri | G06Q 30/02 | 705/14.1 |
| 2014/0132210 A1 * | 5/2014 | Partovi | H02J 7/025 | 320/108 |
| 2014/0148965 A1 * | 5/2014 | Epstein | B60L 11/1825 | 700/297 |
| 2014/0172282 A1 * | 6/2014 | Feng | B60L 11/1838 | 701/117 |
| 2014/0356656 A1 * | 12/2014 | Chen | H01M 10/441 | 429/62 |
| 2015/0120107 A1 * | 4/2015 | Yu | B60L 11/126 | 701/22 |
| 2015/0214768 A1 * | 7/2015 | Matsuyama | G06Q 50/06 | 700/296 |
| 2015/0266379 A1 * | 9/2015 | Bellin | B60K 35/00 | 701/36 |
| 2015/0291145 A1 * | 10/2015 | Yu | B60W 10/06 | 701/22 |
| 2015/0329003 A1 * | 11/2015 | Li | B60L 11/1816 | 320/134 |
| 2016/0176304 A1 * | 6/2016 | Sun | B60L 11/1816 | 320/108 |
| 2017/0015209 A1 * | 1/2017 | Badger, II | B60L 11/1818 | |

* cited by examiner

VEHICLE-MOUNTED TERMINAL, CHARGING PILE, ELECTRIC BICYCLE, AND RENTAL SYSTEM AND METHOD THEREOF

CROSS REFERENCE TO RELATED APPLICATION

This application claims priority to Chinese Patent Application No. 201610445359.9, filed Jun. 17, 2016, which is incorporated herein by reference as if fully set forth.

FIELD

The present invention relates to the intelligent transportation field, in particular to a vehicle-mounted terminal, a charging pile, an electric bicycle, and a rental system and a rental method of the electric bicycle.

BACKGROUND

As local short-range passenger transport apparatuses, bicycles have particularly outstanding advantages including cheap price, convenience, fitness shaping, environmental protection, and energy conservation, and are one of indispensable and irreplaceable major transportation means in people's life today and in the future.

As the entire society sets a high value upon a low-carbon and green life environment increasingly, a public bicycle rental service has become a choice for widespread use of bicycles in all countries.

A back-end management system that communicates with parking piles is used to manage the affairs related with public bicycle rental. Usually, each bicycle is equipped separately with a bicycle locking device and a card reader that can read a card for bicycle rental and return (arranged on a stationary parking pile or rental pile fixed on the ground). During bicycle rental, the information in a bicycle rental card is read by the card reader, and thereby the bicycle is unlocked from the rental pile. Then, the renter can ride away on the bicycle. The back-end management system is networked with each rental pile, so that the renter can return the bicycle at any other rental outlet. To return the bicycle, the renter can place the bicycle to the locking position, so that the information in the rental card is read by the card reader again, and the bicycle is locked to the rental pile. Thus, the bicycle is returned successfully.

However, in the existing bicycle rental systems, the user information (e.g., fee deduction information) is transmitted via the rental pile to the back-end system. After the user rents a bicycle, the back-end system cannot learn about the condition of the bicycle rented by the user in real time, and cannot exercise control on the rented bicycle.

There is no satisfactory solution to the above problem yet in the prior art.

SUMMARY

An object of embodiments is to provide an apparatus and a method, which can provide the service condition of a rented bicycle to a back-end management system.

To attain the above-mentioned object, a vehicle-mounted terminal for an electric bicycle is provided in an embodiment, comprising: a receiver, configured to receive a rental request; and a controller, configured to: acquire the performance state of an electric bicycle targeted by the rental request, in response to the rental request; communicate with a server to authenticate the validity of a renter, if the acquired performance state meets preset rental criteria; and issue an unlocking instruction signal to a charging pile to which the electric bicycle is locked, to unlock the electric bicycle, if a successful authentication message is received from the server.

Further, the controller is configured to: provide a renter information acquisition means, if the acquired performance state meets the preset rental criteria; and communicate with the server to authenticate the validity of the renter according to the renter information acquired by the renter information acquisition means.

Further, the renter information acquisition means comprises 2D barcode and/or card code; and the renter information comprises at least one of the following information: identity information and account information.

Further, the controller is configured to: control the electric bicycle to power on in response to an unlocking feedback from the charging pile, after issuing the unlocking instruction signal to the charging pile.

Further, the performance state comprises the usable electric capacity in the electric bicycle, and the controller is configured to: determine that the electric bicycle meets the preset rental criteria, if the usable electric capacity in the electric bicycle is higher than a first preset value.

Further, the vehicle-mounted terminal comprises a positioning device configured to provide the position information of the electric bicycle to the controller; the controller is configured to: communicate with the server to report the position information, and control the electric bicycle to power on according to a feedback from the server that indicates the electric bicycle is within a predefined geographical scope as determined by the server, or control the electric bicycle to power off according to a feedback from the server that indicates the electric bicycle is outside of the predefined geographical scope as determined by the server.

Further, the controller is configured to: control the electric bicycle to power off in response to a bicycle locking signal received from the charging pile.

Further, the controller is configured to: issue a charging instruction signal to the charging pile so that the charging pile charges the electric bicycle if the usable electric capacity in the electric bicycle is lower than a second preset value, after controlling the electric bicycle to power off.

Further, the receiver is configured to receive a temporary parking request; and the controller is configured to: control a self-locking device of the electric bicycle to lock up the electric bicycle in response to the temporary parking request.

In another embodiment an electric bicycle is provided, comprising a bicycle body, a battery, and the above-mentioned vehicle-mounted terminal.

In yet another embodiment a charging pile for the above-mentioned electric bicycle is provided, comprising a bicycle locking device and a charging control device, wherein, the bicycle locking device is configured to unlock the electric bicycle in response to the unlocking instruction signal.

Further, the charging pile further comprises a sensor configured to detect the electric bicycle in the locking position; and the bicycle locking device is further configured to perform a bicycle locking action and output a bicycle locking signal according to the detection result of the sensor.

Further, the charging control device is configured to charge the electric bicycle in response to the charging instruction signal.

Further, the charging control device is configured to stop the charging of the electric bicycle in response to the unlocking instruction signal.

In yet another embodiment an electric bicycle rental system is provided, comprising a server, the above-mentioned charging pile, and the above-mentioned electric bicycle.

Further, the charging pile comprises a sensor and a bicycle locking device, wherein, the sensor is configured to detect the electric bicycle in a bicycle locking position; and the bicycle locking device is configured to perform a bicycle locking action according to the detection result of the sensor.

In yet another embodiment an electric bicycle rental method is provided, comprising: acquiring the performance state of an electric bicycle, in response to a rental request for the electric bicycle; communicating with a server to authenticate the validity of a renter, if the acquired performance state meets preset rental criteria; and issuing an unlocking instruction signal to a charging pile to which the electric bicycle is locked, to unlock the electric bicycle, if a successful authentication message is received from the server.

Further, the method comprises: providing a renter information acquisition means, if the acquired performance state meets the preset rental criteria; and acquiring renter information by the renter information acquisition means, and communicating with the server to authenticate the validity of the renter.

Further, the renter information acquisition means comprises 2D barcode and/or card code; and the renter information at least comprises one of the following information: identity information and account information.

Further, the method comprises: controlling the electric bicycle to power on according to an unlocking feedback from the charging pile, after issuing the unlocking instruction signal to the charging pile.

Further, the performance state comprises the usable electric capacity in the electric bicycle, and the method comprises: determining that the electric bicycle meets the preset rental criteria, if the usable electric capacity in the electric bicycle is higher than a first preset value.

Further, the method comprises: acquiring the position information of the electric bicycle; and communicating with the server to report the position information, and controlling the electric bicycle to power on according to a feedback from the server that indicates the electric bicycle is within a predefined geographical scope as determined by the server, or controlling the electric bicycle to power off according to a feedback from the server that indicates the electric bicycle is outside of the predefined geographical scope as determined by the server.

Further, the method comprises: controlling the electric bicycle to power off in response to a bicycle locking signal received from the charging pile.

Further, the method comprises: issuing a charging instruction signal to the charging pile so that the charging pile charges the electric bicycle if the usable electric capacity in the electric bicycle is lower than a second preset value, after controlling the electric bicycle to power off.

Further, the method comprises: receiving a temporary parking request; and controlling a self-locking device of the electric bicycle to lock up the electric bicycle in response to the temporary parking request.

With the above-mentioned technical scheme, the vehicle-mounted terminal communicates with the server, so that the back-end server can obtain the service condition of the rented bicycle in real time, and thereby can monitor and manage the rented bicycle.

Other features and advantages of the present invention will be further detailed in the embodiments hereinafter.

BRIEF DESCRIPTION OF THE DRAWINGS

The accompanying drawings are provided here to facilitate further understanding on the present invention, and constitute a part of this document. They are used in conjunction with the following embodiments to explain the present invention, but shall not be comprehended as constituting any limitation to the present invention. Among the drawings.

DETAILED DESCRIPTION

Hereinafter some embodiments will be detailed with reference to the accompanying drawings. It should be appreciated that the embodiments described here are only provided to describe and explain the present invention, but shall not be deemed as constituting any limitation to the present invention.

Figure 1:
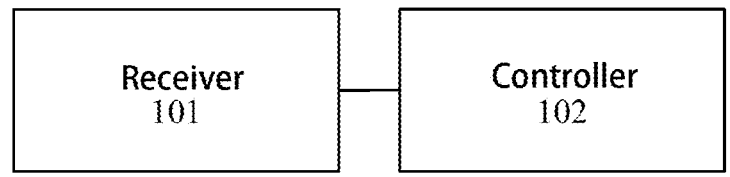
FIG. 1 is a schematic diagram illustrating the composition of a vehicle-mounted terminal in an embodiment.

FIG. 1 is a schematic diagram illustrating the composition of a vehicle-mounted terminal in an embodiment. As shown in FIG. 1, the vehicle-mounted terminal for an electric bicycle provided in the embodiment may comprises a receiver 101 and a controller 102 that communicate with each other, wherein, the receiver 101 may be configured to receive a rental request; and the controller 102 may be configured to: acquire the performance state of an electric bicycle targeted by the rental request, in response to the rental request; communicate with a server to authenticate the validity of a renter, if the acquired performance state meets preset rental criteria; and issue an unlocking instruction signal to a charging pile to which the electric bicycle is locked, to unlock the electric bicycle, if a successful authentication message is received from the server. With the above-mentioned technical scheme, the vehicle-mounted terminal communicates with the server, so that the back-end server can obtain the service condition of the rented bicycle in real time, and thereby can monitor and manage the rented bicycle.

In the embodiment, the receiver 101 may further be configured to receive a temporary parking request; and the controller 102 may be configured to: control a self-locking device of the electric bicycle to lock up the electric bicycle in response to the temporary parking request.

In the embodiment, the receiver 101 may be a trigger that has a physical structure. Examples of the trigger may include buttons that can receive a request from the user, such as "Rent" button, "Return" button, and "Parking" (or "Temporary Parking") button, etc., and other buttons configured to receive a request from the user and issue a request signal to the controller, such as "Gear Position" button, etc.

In other embodiments, the receiver 101 may be a module that has a signal receiving function, and can communicate with a handheld terminal of a user (e.g., a smart phone) and acquire signals such as rental request, return request, temporary parking request, and gear shift request, etc. After receiving a request signal from the user, the receiver 101 may forward the request signal to the controller 102, which will perform corresponding operations according to the type of the request signal.

Figure 2:
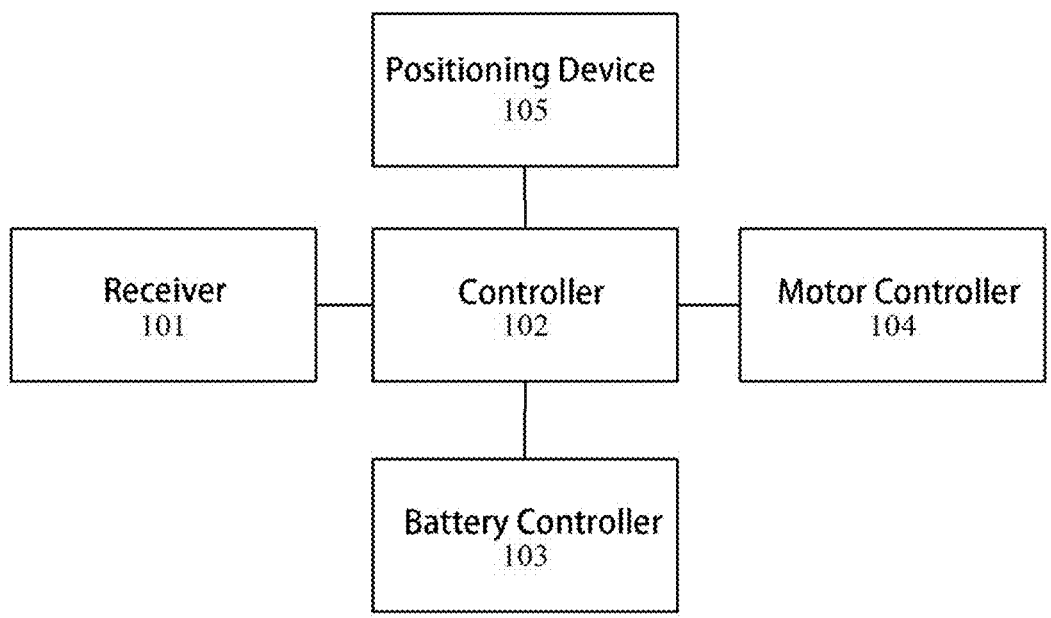
FIG. 2 is a schematic diagram illustrating the composition of a vehicle-mounted terminal in another embodiment.

FIG. 2 is a schematic diagram illustrating the composition of a vehicle-mounted terminal in another embodiment. As shown in FIG. 2, in this embodiment, the controller 102 may have cable and/or wireless communication capability, so as to communicate with the charging pile for the electric bicycle and the back-end server for rental management of the electric bicycle. In this embodiment, the controller 102 may, for example, in response to a rental request received by the receiver 101, acquire the performance state of the electric bicycle targeted by the rental request. For example, the controller 102 may acquire the usable electric capacity of the battery on the current electric bicycle from a battery control circuit (or a battery controller) 103. In addition, the controller 102 may acquire the electric motor state (e.g., whether there is any failure) of the current electric bicycle from a motor controller 104. If the acquired performance state meets preset rental criteria, for example, the usable electric capacity of the battery is adequate and the electric motor is in normal condition, the controller 102 may communicate with the server to authenticate the validity of the renter.

The renter validity authentication may comprise authentication of a variety of information related with the renter, such as renter identity information, renter account information, etc. In the embodiment, the renter identity information may be compared with the registered identity information in an identity information database stored in the server, and the renter identity will be determined as valid if the identity information matches the registered identity information. If the identity information does not match, the renter may be registered as a new user in the server if the renter expects that, and then the identity information will match after successful registration. Accordingly, the renter account information may be manipulated in the server. For example, the account name may be checked, the account name may be bound to the current electric bicycle, the balance in the account may be checked, and the prepayment (or deposit) may be deducted, etc. After the above-mentioned operations, the server may judge that the renter validity authentication is successful, and return a notification message to the controller 102.

When the controller 102 receives a successful validity authentication message from the server, the controller 102 may issue an unlocking instruction signal to the charging pile for the electric bicycle, so that the charging pile unlocks the electric bicycle.

In an embodiment, the charging pile may have a controller configured to charge the electric bicycle and control the locking/unlocking of the electric bicycle. After receiving an unlocking instruction signal from the controller 102, the controller of the charging pile will check the state of the charging circuit. If the charging circuit is in a charging state, the controller of the charging pile will switch off the charging circuit, and then switch off the bicycle locking circuit, so as to unlock the electric bicycle; if the charging circuit is not in a charging state, the controller of the charging pile may directly switch off the bicycle locking circuit so as to unlock the electric bicycle. When the controller of the charging pile switches off the bicycle locking circuit, it may send successful unlocking information or power-on information to the controller 102 in the vehicle-mounted terminal at the same time; after receiving the successful unlocking information or power-on information from the charging pile, the controller 102 may control the motor controller 104, so that the motor controller 104 controls a power-on circuit to connect the battery.

In an alternative embodiment, the charging pile may comprise a bicycle locking device and a charging control device, wherein, the bicycle locking device may be configured to unlock the electric bicycle in response to the unlocking instruction signal. The charging pile may further comprise a sensor configured to detect the electric bicycle in the bicycle locking position. The bicycle locking device may perform a bicycle locking action and output a bicycle locking signal according to the detection result of the sensor. In this embodiment, the charging control device may charge the electric bicycle in response to the charging instruction signal, or stop the charging of the electric bicycle in response to the unlocking instruction signal.

In an embodiment, the controller 102 may be configured to provide a renter information acquisition means if the acquired performance state of the electric bicycle meets the preset rental criteria (e.g., the usable battery capacity is higher than a preset value, and the electric motor is in normal condition). An example of the preset rental criteria may be: the current usable battery capacity is higher than 60% of the total capacity of the battery and the electric motor is in normal condition. In another example, the preset rental criteria may be: the current battery voltage is higher than 35V and the electric motor is in normal condition. In other examples, the preset rental criteria may be: the current usable battery capacity is higher than 1.5 kW and the electric motor is in normal condition. It should be noted that the electric motor seldom has failures. Therefore, the above-mentioned judging criteria may be simplified, so that the performance state of the electric bicycle can be determined as meeting the preset rental criteria if the usable battery capacity meets the preset rental requirement.

An example of the acquisition means may be: display a 2D barcode and/or card code on a display unit (not shown) to provide a renter information input interface. The renter may enable the controller 102 to acquire the information by scanning the 2D barcode or swiping an IC card (e.g., in a wireless manner), so that the controller 102 can communicate with the server to authenticate the validity of the renter according to the renter information acquired by the above-mentioned acquisition means. After acquiring the renter information, the controller 102 may store the acquired renter information in a memory unit (not shown) of the vehicle-mounted terminal first.

In an embodiment, the controller 102 may control the electric bicycle to power on in response to an unlocking feedback from the charging pile, after issuing the unlocking instruction signal to the charging pile. In a different embodiment, the power-on control of the electric bicycle may be accomplished by the controller 102 or may be accomplished by the controller 102 by enabling a dedicated motor controller 104 or battery controller 103 so that the battery of the electric bicycle supplies power to the electric motor.

In an embodiment, the controller 102 may communicate with the charging pile via a wired interface (e.g., when the electric bicycle is in locked state), and may communicate with the back-end server via the charging pile. In a preferred embodiment, the controller 102 may directly communicate with the back-end server in a wireless manner. In such an embodiment, the controller 102 may have a wireless communication module, such as an SIM card module, so as to communicate with the back-end server over a communication network (e.g., 2G, 3G or 4G network). In addition, utilizing a triangulation principle based on the communication network, the electric bicycle on which the vehicle-mounted terminal provided in the embodiments is mounted can be positioned through communication with the communication network.

In a different embodiment, to realize more accurate positioning, the vehicle-mounted terminal provided in the embodiments may comprise a positioning device 105. The positioning device 105 may be a GPS-based positioning device (or BeiDou-based positioning device) configured to provide the position information of the electric bicycle to the controller 102. Accordingly, the controller 102 may be configured to communicate with the server to report the position information of the electric bicycle.

Utilizing the position information, the service condition of the electric bicycle may be tracked. For example, the movement track and movement speed of the electric bicycle can be obtained from the position information. In a preferred embodiment, the position information may be utilized to implement an electronic fence function. For example, the controller 102 may control the electric bicycle to power on or keep it in ON state according to a feedback from the back-end server that indicates the electric bicycle is within a predefined geographical scope; or control the electric bicycle to power off according to a feedback from the server that indicates the electric bicycle is outside of the predefined geographical scope. In the embodiment, the geographical scope may be set according to the travel range (e.g., consider the battery capacity of the electric bicycle or traffic control factor) and the density of the electric bicycle rental outlets.

Besides controlling the electric bicycle to power off when the electric bicycle is outside of the predefined geographical scope, the controller 102 may be further configured to control the electric bicycle to power off in response to a bicycle locking signal received from the charging pile. In this embodiment, the renter may have to return the electric bicycle. When the electric bicycle is placed at a predefined position near the charging pile (i.e., at a position where the electric bicycle can be locked), the charging pile may detect that the electric bicycle is at the charging pile by means of a sensor (e.g., a pressure sensor or position sensor) arrange on the charging pile, and thereby accomplish the bicycle locking action automatically. The charging pile may comprise a bicycle locking device, so as to execute the bicycle locking action according to the detection result of the sensor. In that process, the sensor may send information to the charging pile (specifically, the charging pile controller) once it detects that the electric bicycle is placed at the charging pile, and the charging pile controller may activate the bicycle locking circuit to lock up the bicycle. After the charging pile controller sends successful bicycle locking information (and the charging pile ID information) to the controller 102 in the vehicle-mounted terminal (e.g., via the terminals (e.g., charging terminals) on the electric bicycle and the terminals on the charging pile, which contact with each other), the controller 102 in the vehicle-mounted terminal may control the motor controller to control the power-on circuit to cut off the power supply from the battery, and send successful bicycle return information to the back-end server. The back-end server may execute a bicycle return procedure (e.g., deduct money from the account, delete the bicycle return record, store the charging pile ID information, etc.); then, the back-end server sends successful bicycle return information to the receiver 102 in the vehicle-mounted terminal. In addition, the controller 102 in the vehicle-mounted terminal may detect the remaining battery capacity via a battery capacity detection circuit, and may send a charging command to the charging pile controller (e.g., via the charging terminals on the electric bicycle, which are connected to the charging pile) if charging is required (e.g., when the remaining battery capacity of the electric bicycle is lower than a preset value); after receiving the charging command, the charging pile controller will activate the charging circuit to charge the electric bicycle. In the embodiment, whether charging is required may be judged by the percentage of the remaining battery capacity, the quantity of the remaining battery capacity, or the battery voltage. For example, the controller 102 will send a charging command to the charging pile controller if the percentage of remaining battery capacity is lower than 30%, the remaining capacity is lower than 0.5 kW, or the battery voltage is lower than 30V (the battery voltage is 36V in fully charged state). Compared with a scheme that the electric bicycle is charged once the bicycle locking action is completed, the above-mentioned embodiment can effective improve the battery life. Of course, alternatively, embodiments may employ the scheme that the electric bicycle is charged once the bicycle locking action is completed, to ensure the electric bicycle for rental has sufficient battery capacity.

Figure 3:
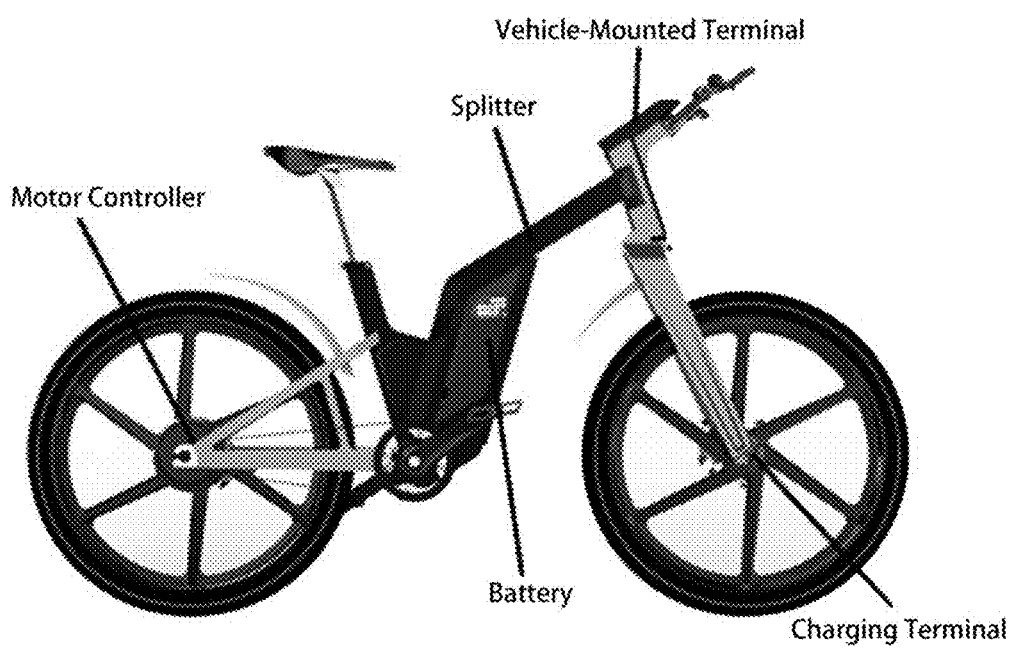
FIG. 3 is a schematic diagram illustrating the composition of an electric bicycle in an embodiment.

FIG. 3 is a schematic diagram illustrating the composition of an electric bicycle in an embodiment. As shown in FIG. 3, the electric bicycle provided in this embodiment, the electric bicycle comprises a bicycle body, a battery, and the above-mentioned vehicle-mounted terminal.

Figure 4:
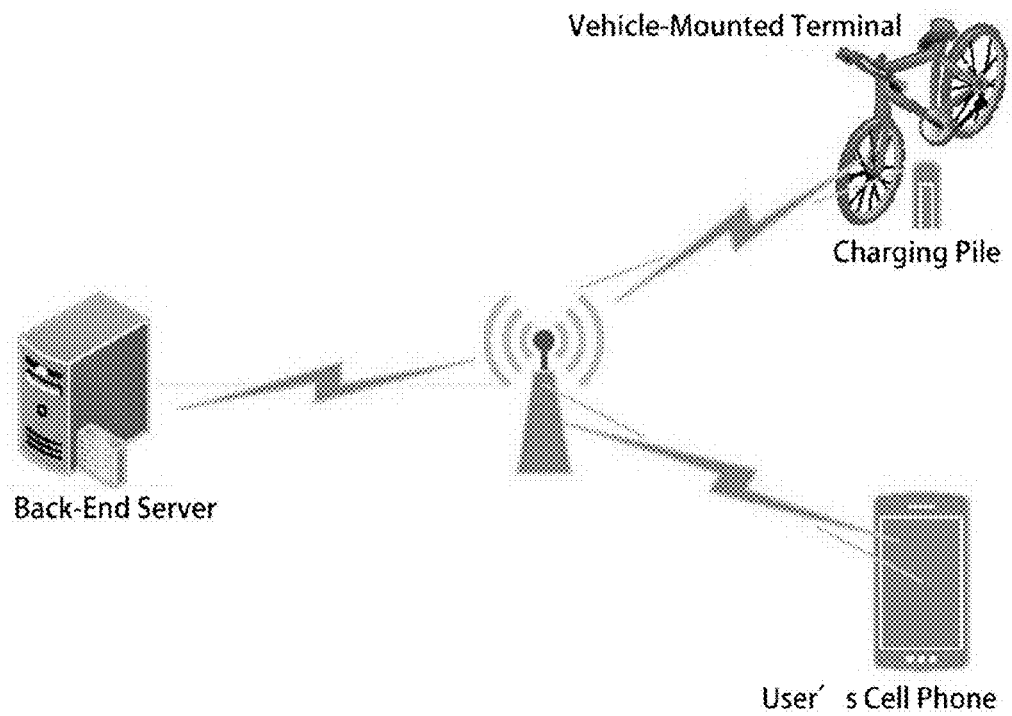
FIG. 4 is a schematic diagram illustrating the composition of an electric bicycle rental system in an embodiment.

FIG. 4 is a schematic diagram illustrating the composition of an electric bicycle rental system in an embodiment. As shown in FIG. 4, the electric bicycle rental system provided in the present invention may comprise a server, a charging pile, and the electric bicycle shown in FIG. 3.

In yet another aspect, embodiments provide an electric bicycle rental method.

Figure 5:
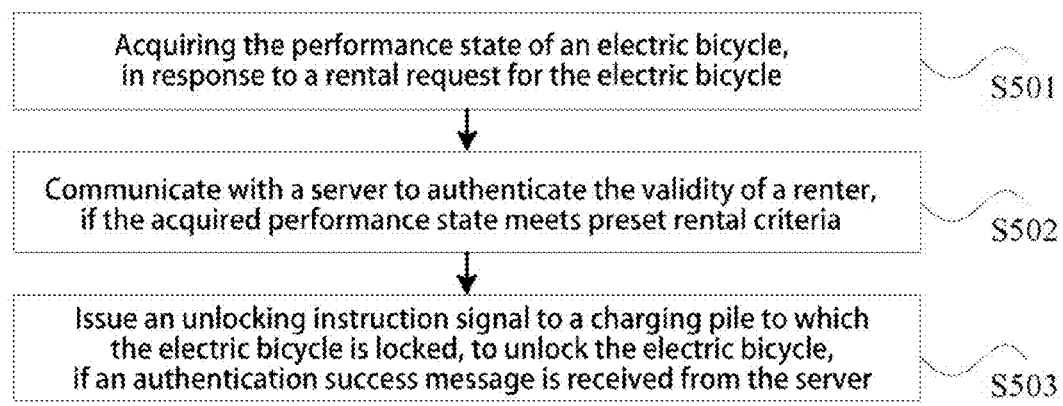
FIG. 5 is a flow chart illustrating the electric bicycle rental method in an embodiment.

FIG. 5 is a flow chart illustrating the electric bicycle rental method in an embodiment. As shown in FIG. 5, the electric bicycle rental method provided in this embodiment may comprise:

S501: acquiring the performance state of an electric bicycle, in response to a rental request for the electric bicycle;

S502: communicating with a server to authenticate the validity of a renter, if the acquired performance state meets preset rental criteria; and S503: issuing an unlocking instruction signal to a charging pile to which the electric bicycle is locked, to unlock the electric bicycle, if a successful authentication message is received from the server.

In this embodiment, the above-mentioned process may be initiated by activating a trigger button (e.g., a "Rent" button) on the electric bicycle.

In this embodiment, the above-mentioned method may comprise: providing a renter information acquisition means, if the acquired performance state meets the preset rental criteria; and acquiring renter information by the renter information acquisition means, and communicating with the server to authenticate the validity of the renter. The renter validity authentication may comprise authentication of a variety of information related with the renter, such as renter identity information, renter account information, etc. In the embodiment, the renter identity information may be compared with the registered identity information in an identity information database stored in the server, and the renter identity will be determined as valid if the identity information matches the registered identity information. If the identity information does not match, the renter may be registered as a new user in the server if the renter expects that, and then the identity information will match after successful registration. Accordingly, the renter account information may be manipulated in the server. For example, the account name may be checked, the account name may be bound to the current electric bicycle, the balance in the account may be checked, and the prepayment (or deposit) may be deducted, etc.

In this embodiment, the performance state of the electric bicycle may comprise the usable electric capacity of the battery on the electric bicycle, and the above-mentioned method may comprise: determining that the electric bicycle meets the preset rental criteria, if the usable electric capacity in the electric bicycle is higher than a first preset value.

In a different embodiment, the performance state of the electric bicycle may comprise both the usable electric capacity of the battery on the electric bicycle and the state of the electric motor of the electric bicycle, and the above-mentioned method may comprise: determining that the electric bicycle meets the preset rental criteria, if the usable electric capacity in the electric bicycle is higher than a first preset value and the electric motor is in normal condition.

An example of the preset rental criteria may be: the current usable battery capacity is higher than 60% of the total capacity of the battery and the electric motor is in normal condition. In another example, the preset rental criteria may be: the current battery voltage is higher than 35V and the electric motor is in normal condition. In other examples, the preset rental criteria may be: the current usable battery capacity is higher than 1.5 kW and the electric motor is in normal condition.

In the embodiment, to monitor the state of the rented electric bicycle, the method may further comprise: acquiring the position information of the electric bicycle; and communicating with the server to report the position information, and controlling the electric bicycle to power on according to a feedback from the server that indicates the electric bicycle is within a predefined geographical scope as determined by the server, or controlling the electric bicycle to power off according to a feedback from the server that indicates the electric bicycle is outside of the predefined geographical scope as determined by the server. Utilizing the position information, the service condition of the electric bicycle may be tracked. For example, the movement track and movement speed of the electric bicycle can be obtained from the position information. In a preferred embodiment, the position information may be utilized to implement an electronic fence function. In the embodiment, the geographical scope may be set according to the travel range (e.g., consider the battery capacity of the electric bicycle or traffic control factor) and the density of the electric bicycle rental outlets.

Corresponding to the unlocking process in the rental method, the following electric bicycle return process may be executed: judging the electric bicycle is at a bicycle locking position near the charging pile; locking up the electric bicycle; and controlling the electric bicycle to power off in response to a bicycle locking signal received from the charging pile. In this embodiment, a charging instruction signal will be sent to the charging pile so that the charging pile charges the electric bicycle, if the remaining battery capacity in the electric bicycle is lower than a second preset value, after the electric bicycle is controlled to power off. For example, a charging instruction signal is sent to the charging pile so that the charging pile charges the electric bicycle if the percentage of remaining battery capacity is lower than 30%, the remaining battery capacity is lower than 0.5 kW, or the battery voltage is lower than 42V (the battery voltage is 48V in fully charged state).

In the embodiment, the above-mentioned method may further comprise a temporary parking process: first, receiving a temporary parking request; then, controlling a self-locking device of the electric bicycle (e.g., a head lock) to lock up the electric bicycle in response to the temporary parking request. Accordingly, when the electric bicycle is to be used again after the temporary parking, the process of the above-mentioned rental method may be executed, with a difference that an unlocking instruction signal is sent to the electric bicycle (or the vehicle-mounted terminal on the electric bicycle) to instruct the self-locking device of the electric bicycle to unlock the electric bicycle after a successful validity authentication message is received from the server.

Hereinafter the process of the method provided in the present invention will be detailed with reference to specific embodiments.

Figure 6:
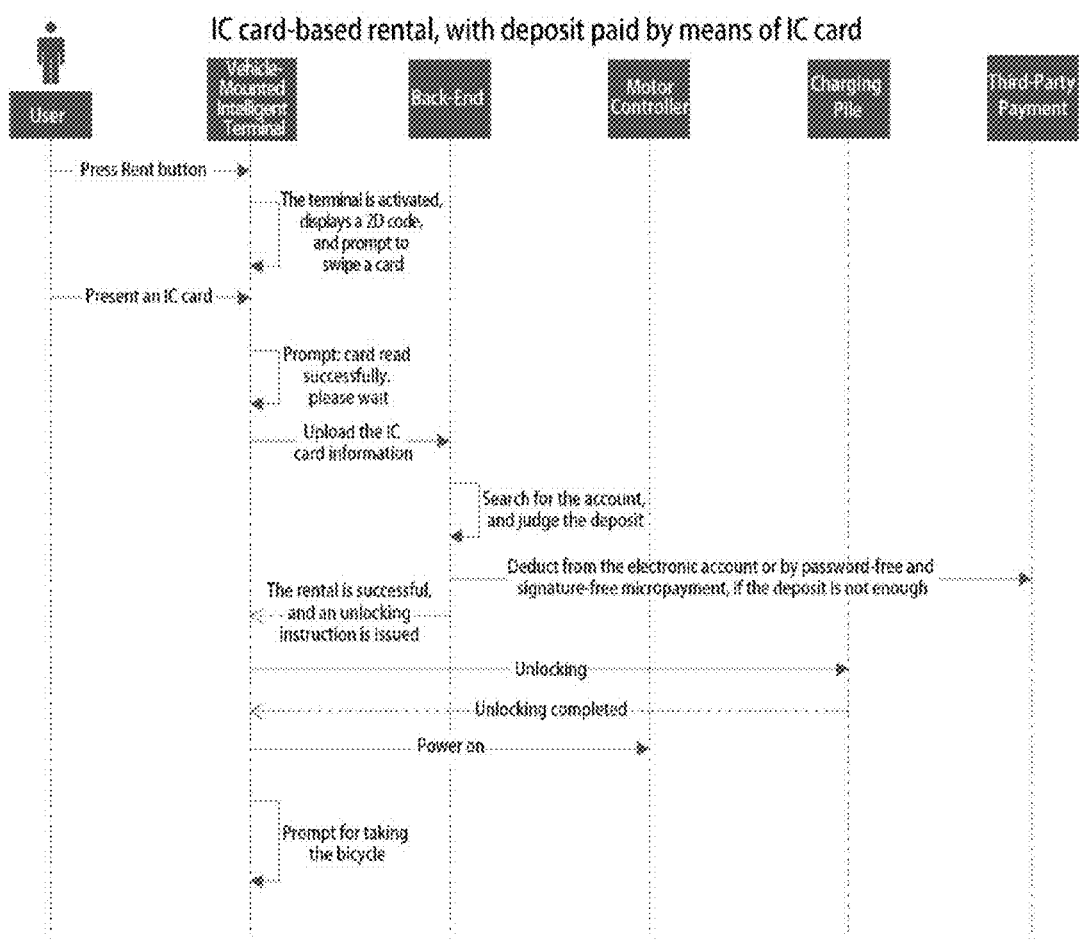
FIG. 6 is a flow chart illustrating the IC card-based bicycle rental process in an embodiment.
Figure 7:
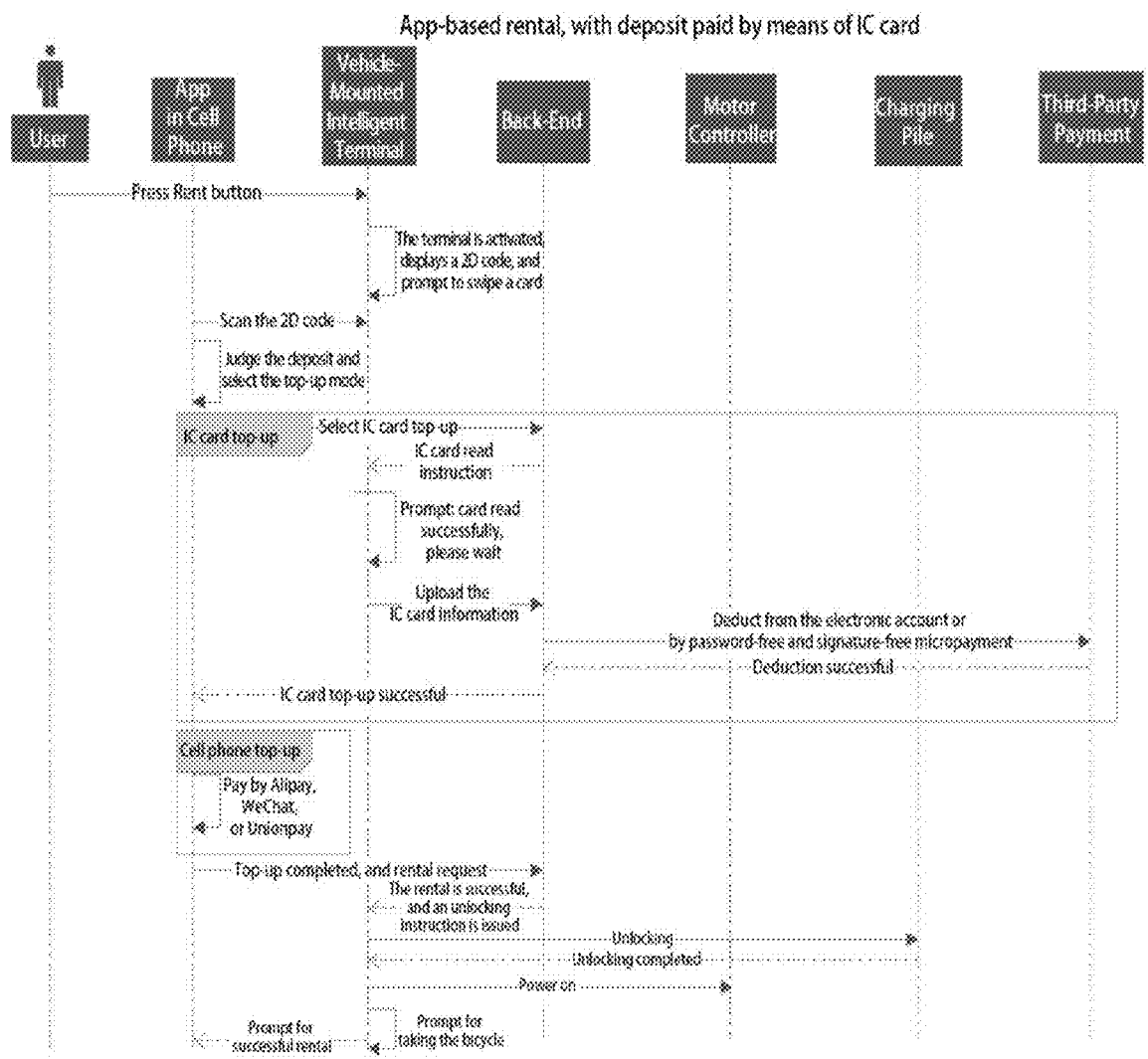
FIG. 7 is a flow chart illustrating the App-based bicycle rental process by a user in an embodiment.

FIG. 6 and FIG. 7 show an IC card-based rental process and an App-based rental process respectively, wherein, FIG. 6 is a flow chart illustrating an IC card-based bicycle rental method in an embodiment. As shown in FIG. 6, the process starts once the user presses a "Rent" button. A display screen mounted on the bicycle displays rental information (a 2D barcode or a prompt for swiping card). In this embodiment, the vehicle-mounted intelligent terminal may continuously acquire the current battery capacity. Thus, the display screen on the bicycle will display "Battery low, unavailable for rent" when the user presses the "Rent" button, if the battery capacity is lower than a preset value (e.g., 30%). The vehicle-mounted intelligent terminal uploads IC card information (e.g., user identity information or user account information) to the back-end server. The back-end server pushes information to the vehicle-mounted intelligent terminal after information processing (e.g., search for the account, and judge the deposit, etc.). In this embodiment, when the user swipes an IC card (or contactless card) on the vehicle-mounted intelligent terminal, the account will be searched for according to the IC card ID. If no existing account is found, a new account may be added and bound to the IC card automatically. If there is no deposit or the deposit is not enough, payment deduction from an electronic wallet or payment deduction by password-free and signature-free micropayment may be used. After the vehicle-mounted intelligent terminal receives a "rent successful" feedback, it will notify the charging pile to unlock the bicycle; otherwise it will display the failure cause and exit. Thus, the rental process is completed. After the rental process is completed successfully, the vehicle-mounted intelligent terminal may log the bound IC card ID returned from the back-end system, which can be used for bicycle unlocking after temporary parking. For example, in a case that there is no network signal coverage, any IC card bound to the user may be used to unlock the bicycle.

FIG. 7 is a flow chart illustrating the App-based bicycle rental process in an embodiment. As shown in FIG. 7, the process starts once the user presses a "Rent" button. The display screen of the vehicle-mounted intelligent terminal displays the rental information. The vehicle-mounted intelligent terminal may continuously acquire the current battery capacity. Thus, the display screen on the bicycle will display "Battery low, unavailable for rent" when the user presses the "Rent" button, if the battery capacity is lower than a preset value (e.g., 30%). The user may scan the 2D barcode displayed on the screen with an App in his/her cell phone to acquire the information on the bicycle. If there is no deposit or the deposit is not enough, a prompt for payment deduction from an IC card, Alipay account, or WeChat account may be provided. If the user chooses to pay from an IC card account, he/she may use the App to request the vehicle-mounted intelligent terminal via the back-end system to activate an IC card reader; then, the display screen on the bicycle will display "Please swipe your IC card" thus, the payment may be deducted from an electronic wallet or by password-free and signature-free micropayment, and the account will be bound to the IC card automatically. After the App front-end (back-end) finishes the processing, it will push information to the vehicle-mounted intelligent terminal. After the vehicle-mounted intelligent terminal receives a "rent successful" feedback, it will notify the charging pile to unlock the bicycle; otherwise it will display the failure cause and exit. Thus, the rental process is completed.

Figure 8:
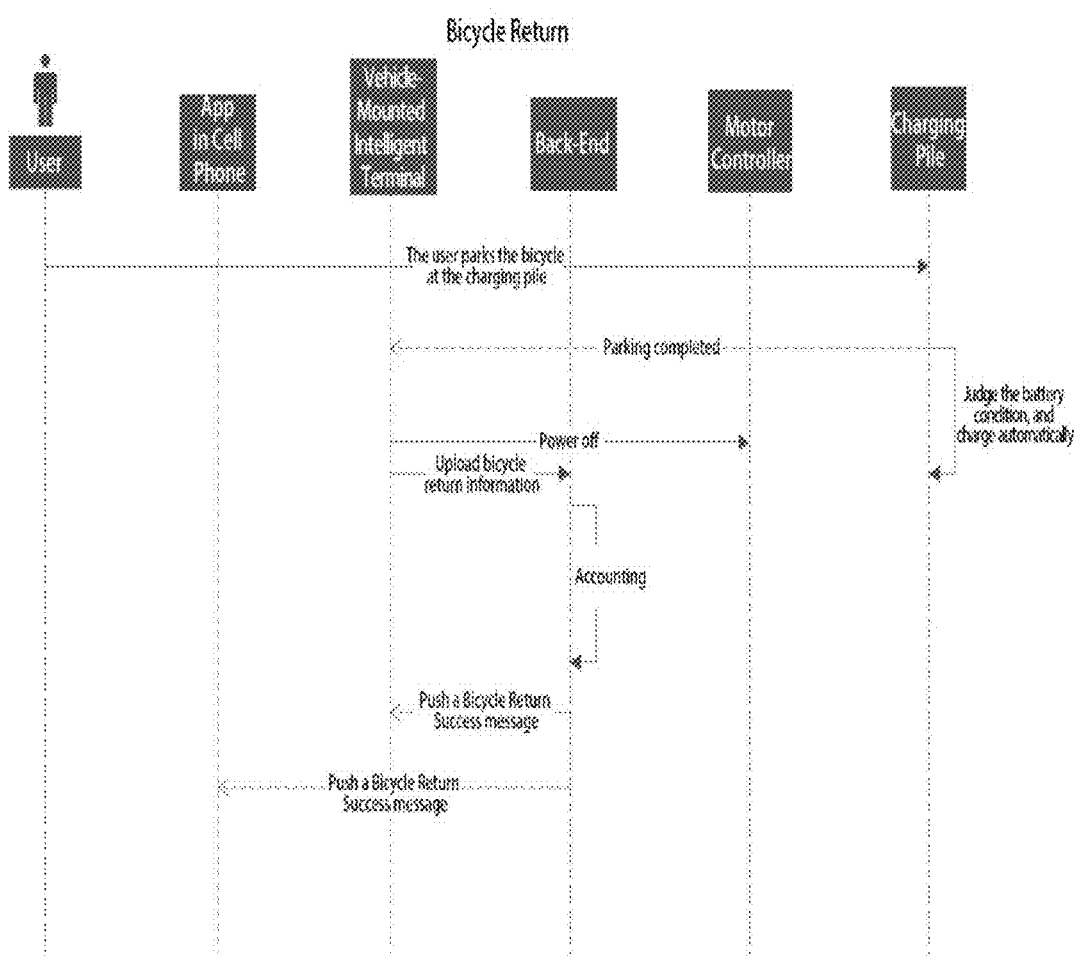
FIG. 8 is a flow chart illustrating the bicycle return process in an embodiment.

FIG. 8 is a flow chart illustrating the bicycle return process in an embodiment. As shown in FIG. 8, when the user places the bicycle at the charging pile, the charging pile will finish the bicycle locking action. After the intelligent terminal receives successful bicycle locking information from the charging pile, it will send successful bicycle return information to the back-end server. The back-end server may feed the rental information back to the vehicle-mounted intelligent terminal. For example, the vehicle-mounted intelligent terminal may display information "rental duration: xx h xx min., payment of rent: $ xx.xx, balance of account: $ xx.xx, return successful" on the display screen of the intelligent terminal. After the bicycle is returned successfully, the vehicle-mounted intelligent terminal may delete the logged information related with the user (e.g., card ID, etc.) from the memory and reset.

Figure 9:
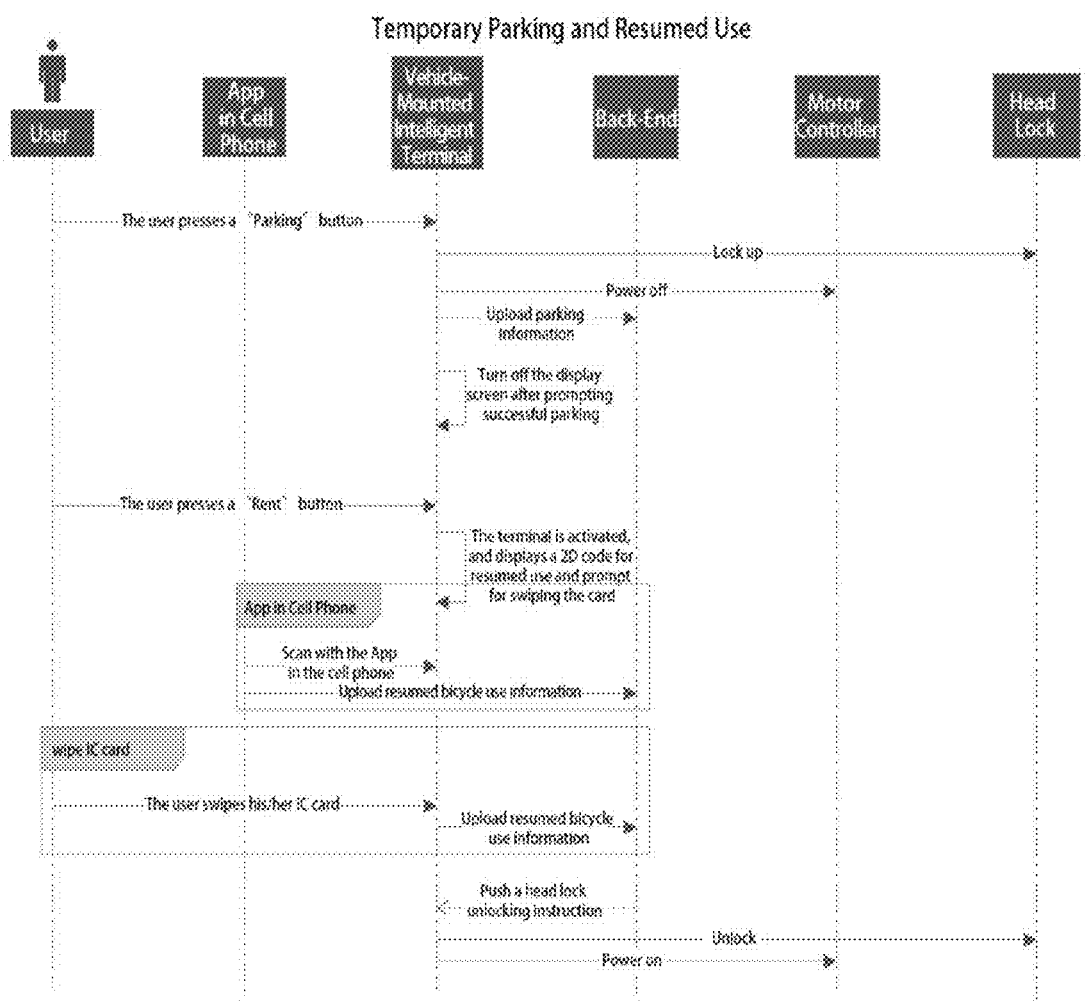
FIG. 9 is a flow chart illustrating the temporary parking and resumed rental process in an embodiment.

FIG. 9 is a flow chart illustrating the temporary parking and resumed rental process in an embodiment. As shown in FIG. 9, the user may press a "Parking" button when the bicycle is in a stopped state; thus, the vehicle-mounted intelligent terminal controls a self-locking device of the electric bicycle (e.g., a head lock) to lock up the bicycle, submits information to the back-end server after the locking is finished, and displays information "Bicycle locked successfully" on the display screen of the intelligent terminal at the same time. If the user expects to continue the use of the electric bicycle, he/she may unlock the locked bicycle through the rental process shown in FIG. 6 or FIG. 7, so that he/she can continue the use. It should be noted that the "Parking" and "Rent" buttons are ineffective when the bicycle is in running state. Especially, it is forbidden to lock up the electric bicycle when the electric bicycle is in running state, to avoid danger.

Figure 10:
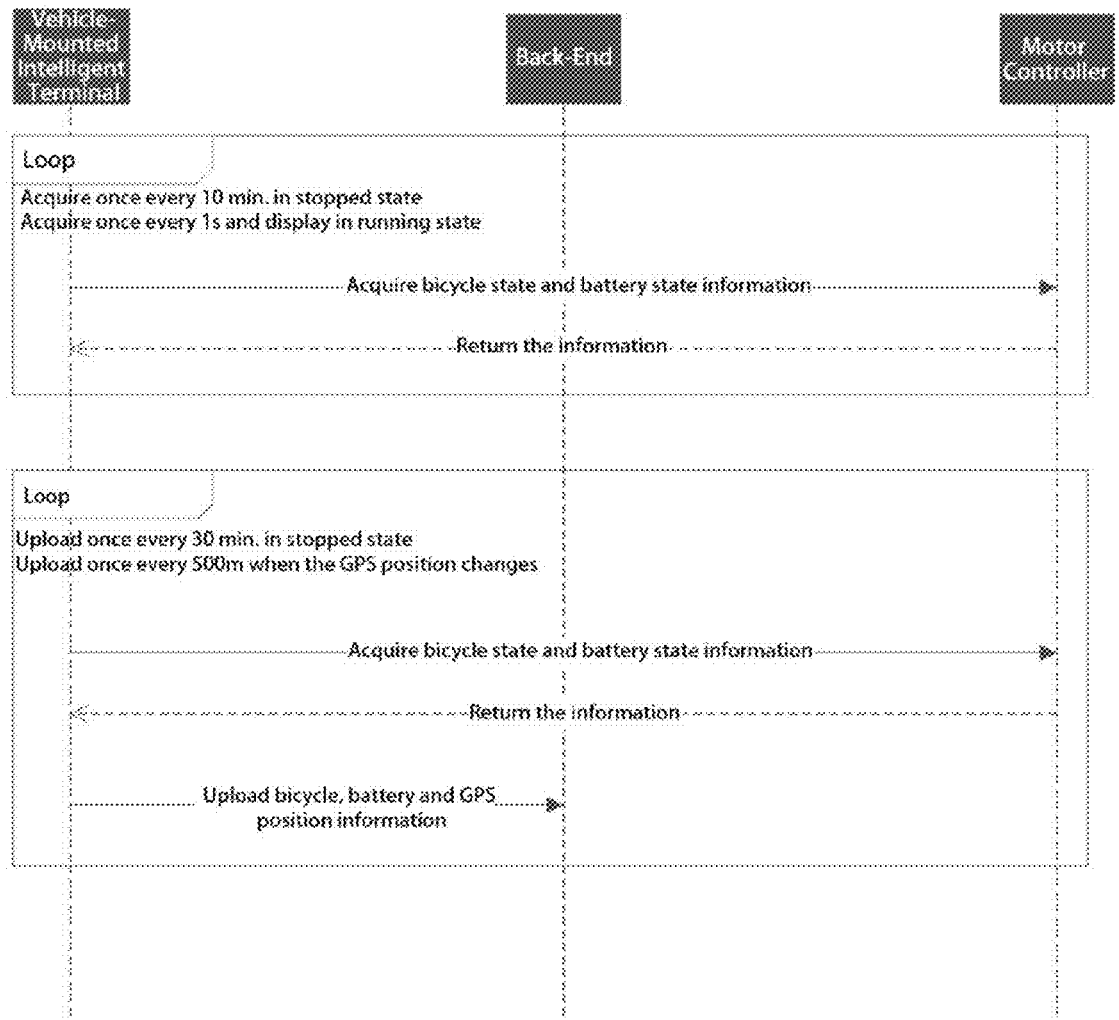
FIG. 10 is a flow chart illustrating the state information reading process in an embodiment.

FIG. 10 is a flow chart illustrating the state information reading process in an embodiment. FIG. 10 shows that the illustrated vehicle-mounted intelligent terminal reports the state information of the electric bicycle to the back-end server. In the embodiment, the examples of bicycle state information include, but not limited to: normal condition, braked, handles not reset (at a high level), handle failure, low-voltage protection, over-voltage protection, failure of Hall signal wires in the motor, failure of phase wires in the motor, controller temperature at protection point, failure of temperature sensor in the controller, failure of current sensor, abnormal temperature in battery, failure of temperature sensor in the motor, speed sensor failure, communication failure of battery management system (BMS), headlight failure, headlight sensor failure, and communication failure, etc.

Figure 11:
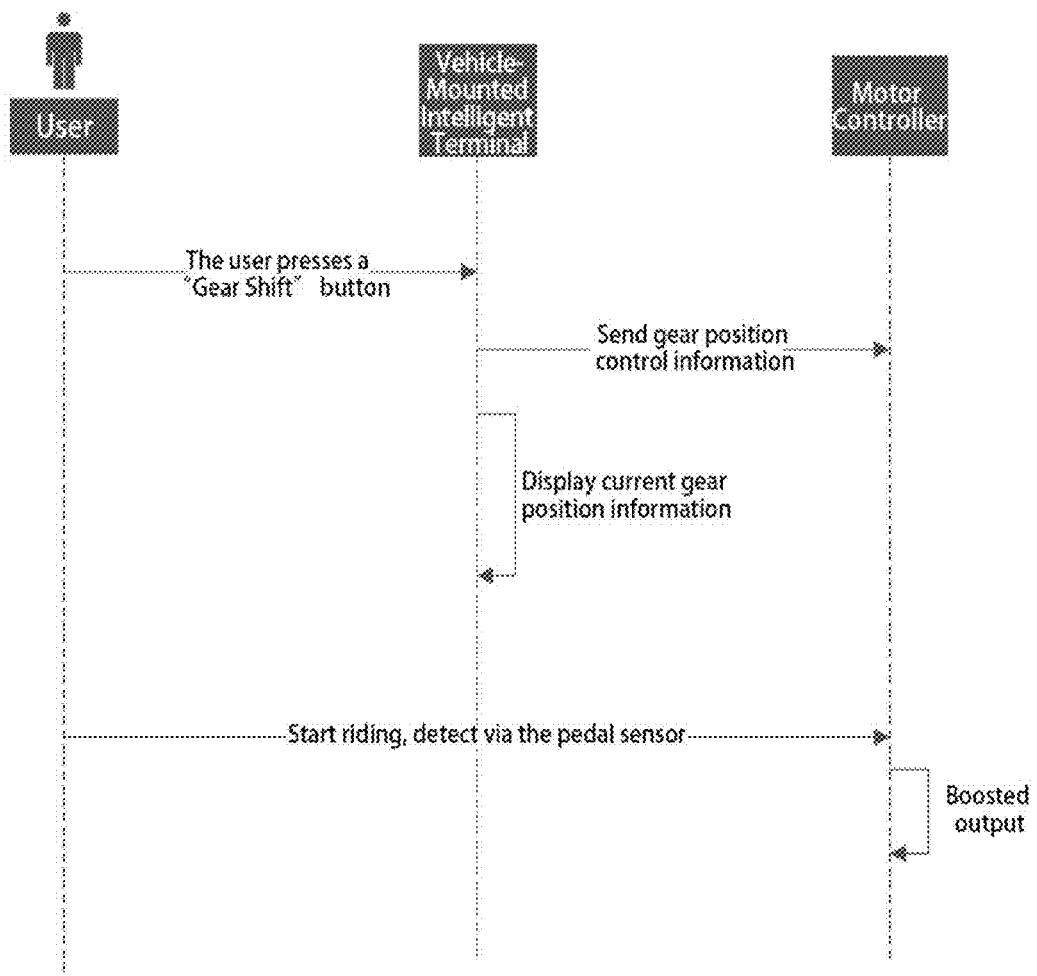
FIG. 11 is a flow chart illustrating the gear shift control process of an electric bicycle in an embodiment.

FIG. 11 is a flow chart illustrating the gear shift control process of an electric bicycle in an embodiment. The electric bicycle electric bicycle provided in the embodiments may have multiple speed "gear positions," which can be controlled with a "Gear Shift" button arranged on the bicycle body through the gear shift control process shown in FIG. 11.

Figure 12:
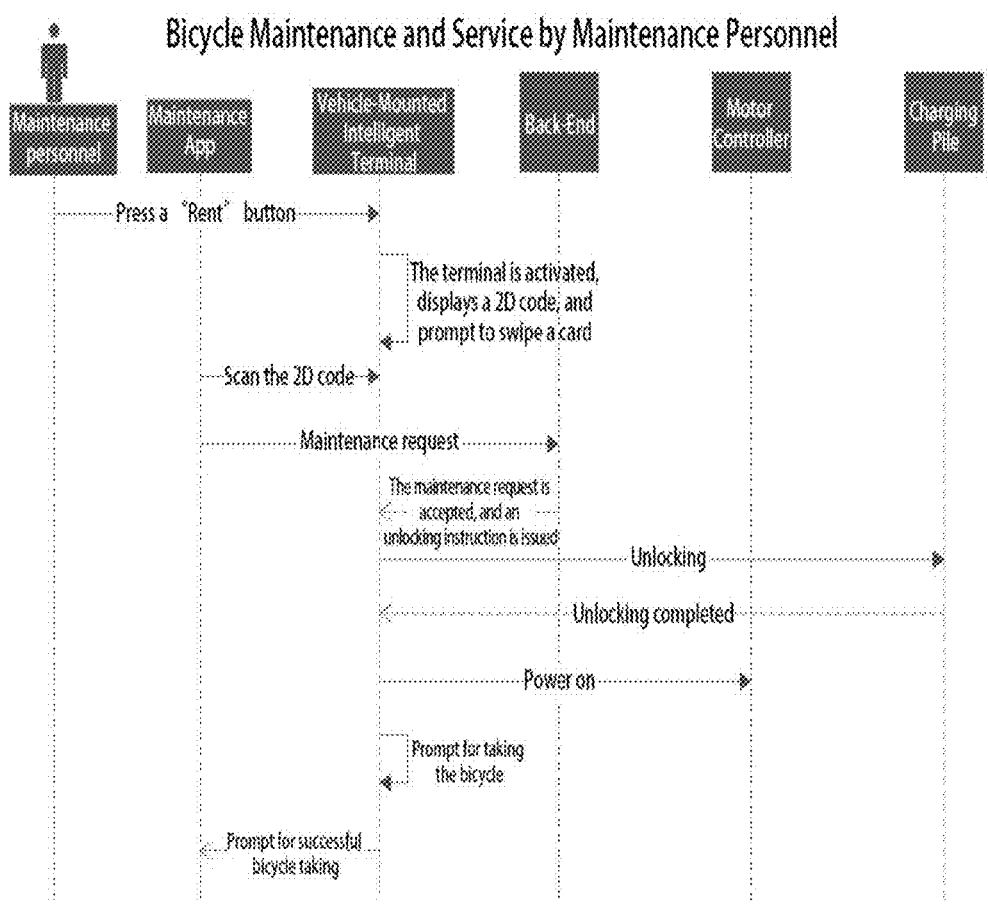
FIG. 12 is a flow chart illustrating the bicycle maintenance process in an embodiment.

FIG. 12 is a flow chart illustrating the bicycle maintenance process in an embodiment. As shown in FIG. 12, in the embodiments, an unlocking (or locking) process for maintenance and service of the electric bicycle is further provided. Through that process, the maintenance personnel can control the unlocking of the electric bicycle to be maintained.

Figure 13:
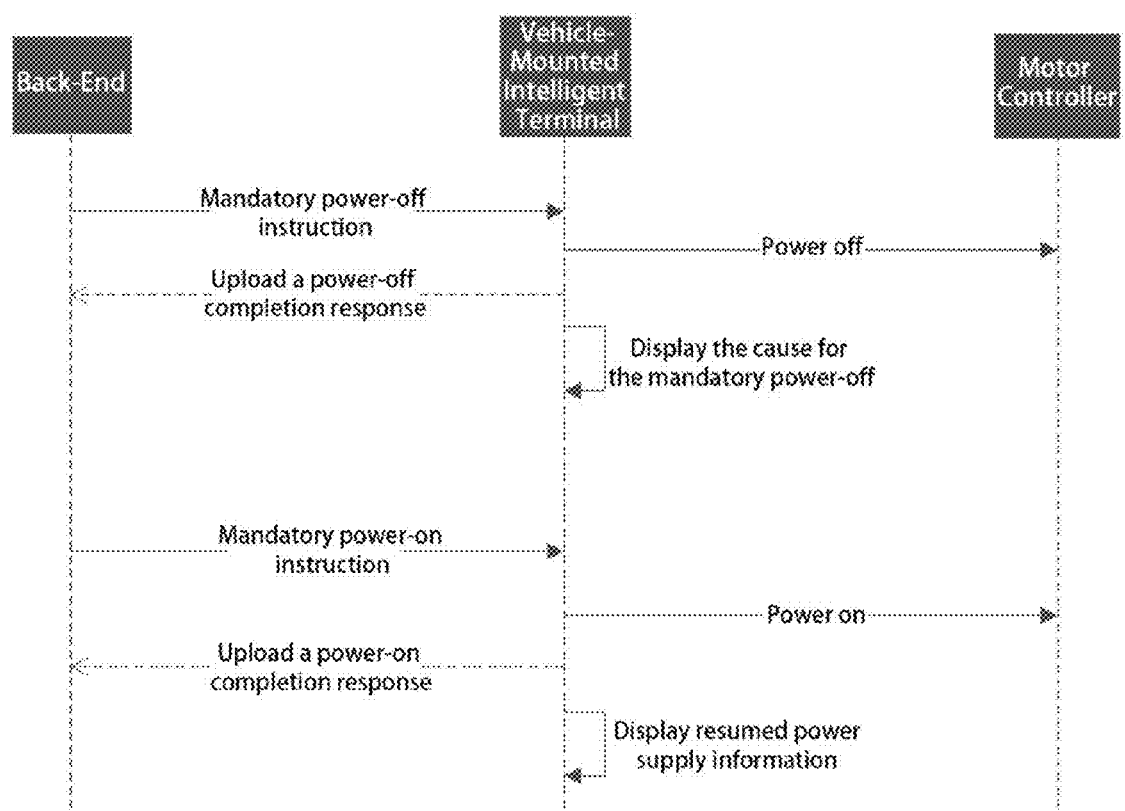
FIG. 13 is a flow chart illustrating the process of mandatory control from the back-end server in an embodiment.

FIG. 13 is a flow chart illustrating the process of mandatory control from the back-end server in an embodiment. Through the process shown in FIG. 13, the electric bicycle can be controlled remotely. For example, an electronic fence may be set, and the back-end server will send a mandatory power-off command to the vehicle-mounted intelligent terminal to power off the motor controller when the electric bicycle goes out of the scope of the electronic fence. Accordingly, when the electric bicycle returns into the scope of the electronic fence, the back-end server may send a mandatory power-on command to the vehicle-mounted intelligent terminal, so as to recovery the power supply to the motor controller.

While some preferred embodiments of the present invention are described above with reference to the accompanying drawings, the present invention is not limited to the details in those embodiments. Those skilled in the art can make modifications and variations to the technical scheme of the present invention, without departing from the spirit of the present invention. However, all these modifications and variations shall be deemed as falling into the protected scope of the present invention. For example, the vehicle-mounted terminal may be replaced with a vehicle-mounted intelligent terminal, and/or the server may be replaced with a back-end computer or back-end server.

In addition, it should be appreciated that the technical features described in the above embodiments can be combined in any appropriate manner, provided that there is no conflict among the technical features in the combination. To avoid unnecessary iteration, such possible combinations are not described here in the present invention.

Moreover, different embodiments of the present invention can be combined freely as required, as long as the combinations do not deviate from the ideal and spirit of the present invention. However, such combinations shall also be deemed as falling into the scope disclosed in the present invention.

What is claimed is:

1. A vehicle-mounted terminal for an electric bicycle, comprising:

a receiver, configured to receive a rental request; and
a controller, configured to:
  acquire the performance state of an electric bicycle targeted by the rental request, in response to the rental request;
  communicate with a server to authenticate the validity of a renter, if the acquired performance state meets preset rental criteria;
  issue an unlocking instruction signal to a charging pile to which the electric bicycle is locked, to unlock the electric bicycle, if a successful authentication message is received from the server; and
a positioning device configured to provide a position information of the electric bicycle to the controller;
the controller further configured to: communicate with the server to report the position information, and control the electric bicycle to power on according to a feedback from the server that indicates the electric bicycle is within a predefined geographical scope as determined by the server, or control the electric bicycle to power off according to a feedback from the server that indicates the electric bicycle is outside of the predefined geographical scope as determined by the server, wherein the predefined geographical scope is associated with a travel range determined by battery capacity of the electric bicycle and distance to the nearest electric bicycle rental outlet.

2. The vehicle-mounted terminal according to claim 1, further comprising:
  a renter information acquisition means comprising a 2D barcode scanner and/or a wireless IC card reader;
  wherein the renter information comprises at least one of the following: identity information and account information.

3. The vehicle-mounted terminal according to claim 2, wherein the controller is configured to:
  receive renter information using the renter information acquisition means, if the acquired performance state meets the preset rental criteria; and
  communicate with the server to authenticate the validity of the renter according to the renter information received by the renter information acquisition means.

4. The vehicle-mounted terminal according to claim 1, wherein the controller is configured to: control the electric bicycle to power on in response to an unlocking feedback from the charging pile, after issuing the unlocking instruction signal to the charging pile.

5. The vehicle-mounted terminal according to claim 1, wherein the performance state comprises the usable electric capacity in the electric bicycle, and the controller is configured to:
  determine that the electric bicycle meets the preset rental criteria, if the usable electric capacity in the electric bicycle is higher than a preset value.

6. The vehicle-mounted terminal according to claim 1, wherein the receiver is further configured to receive a temporary parking request; and
  the controller is configured to:
  control a self-locking device of the electric bicycle to lock up the electric bicycle in response to the temporary parking request.

7. An electric bicycle comprising a bicycle body, a battery, and the vehicle-mounted terminal according to claim 1.

8. The vehicle-mounted terminal according to claim 1, wherein, the controller is configured to:
  control the electric bicycle to power off in response to a bicycle locking signal received from the charging pile.

9. The vehicle-mounted terminal according to claim 8, wherein, the controller is configured to:
  issue a charging instruction signal to the charging pile so that the charging pile charges the electric bicycle if the usable electric capacity in the electric bicycle is lower than a preset value, after controlling the electric bicycle to power off.

10. An electric bicycle rental method, comprising:
  acquiring, by a controller, the performance state of an electric bicycle, in response to a rental request for the electric bicycle received by a receiver;
  communicating, by the controller, with a server to authenticate the validity of a renter, if the acquired performance state meets preset rental criteria;
  issuing, by the controller, an unlocking instruction signal to a charging pile to which the electric bicycle is locked, to unlock the electric bicycle, if a successful authentication message is received from the server;
  acquiring, by the controller, position information of the electric bicycle from a positioning device; and
  communicating, by the controller, with the server to report the position information, and controlling the electric bicycle to power on according to a feedback from the server that indicates the electric bicycle is within a predefined geographical scope as determined by the server, or controlling the electric bicycle to power off according to a feedback from the server that indicates the electric bicycle is outside of the predefined geographical scope as determined by the server, wherein the predefined geographical scope is associated with a travel range determined by battery capacity of the electric bicycle and distance to the nearest electric bicycle rental outlets.

11. The method according to claim 10, further comprising:
  receiving, by the controller, renter information obtained by a renter information acquisition means, if the acquired performance state meets the preset rental criteria, wherein the renter information acquisition means comprises a 2D barcode scanner and/or a wireless IC card reader, and wherein the renter information comprises at least one of the following: identity information and account information; and
  communicating, by the controller, with the server to authenticate the validity of the renter according to the renter information received by the renter information acquisition means.

12. The method according to claim 10, further comprising: controlling, by the controller, the electric bicycle to power on according to an unlocking feedback from the charging pile, after issuing the unlocking instruction signal to the charging pile.

13. The method according to claim 10, wherein, the performance state comprises the usable electric capacity in the electric bicycle, and the method further comprises:
  determining, by the controller, that the electric bicycle meets the preset rental criteria, if the usable electric capacity in the electric bicycle is higher than a preset value.

14. The method according to claim 10, further comprising:
  receiving, by the receiver, a temporary parking request; and
  controlling, by the controller, a self-locking device of the electric bicycle to lock up the electric bicycle in response to the temporary parking request.

15. The method according to claim 10, further comprising:
 controlling, by the controller, the electric bicycle to power off in response to a bicycle locking signal received from the charging pile.

16. The method according to claim 15, further comprising:
 issuing, by the controller, a charging instruction signal to the charging pile so that the charging pile charges the electric bicycle if the usable electric capacity in the electric bicycle is lower than a preset value, after controlling the electric bicycle to power off, to improve the battery life.

\* \* \* \* \*